3,069,464
METHOD FOR MANUFACTURE OF GAMMA L-GLUTAMYL HYDRAZIDE
Martin Everett Hultquist, Boulder, Colo., assignor to Arapahoe Chemicals, Inc., a corporation of Colorado
No Drawing. Filed Dec. 5, 1958, Ser. No. 782,344
1 Claim. (Cl. 260—534)

This invention relates to a novel multi-stage process for the manufacture of gamma L-glutamyl hydrazide.

Prior to this invention, a number of multi-stage processes have been used for the manufacture of gamma L-glutamyl hydrazide. An example of such processes is disclosed in Rath U.S. Patent No. 2,788,370, granted April 9, 1957. In the prior art processes an aqueous solution of L-glutamic acid is heated at an elevated temperature for a sufficient period of time (e.g. autoclaved at 120° C. for 8 hours) to effect dehydration of the acid whereby L-pyrrolidone carboxylic acid is produced. The L-pyrrolidone carboxylic acid is then isolated and purified by suitable means, and the pure acid is then reacted with anhydrous hydrazine to convert the L-pyrrolidone carboxylic acid to gamma L-glutamyl hydrazide.

It is seen therefore that the above referred to prior methods involve the isolation and purification of L-pyrrolidone carboxylic acid obtained from the dehydration of L-glutamic acid. This purification step for obtaining the pure intermediate adds considerably to the cost of obtaining the desired gamma L-glutamyl hydrazide. Another drawback of the prior art processes is the use of anhydrous hydrazine for the conversion of L-pyrrolidone carboxylic acid to gamma L-glutamyl hydrazide. The use of anhydrous hydrazine is not desirable for it is not only a very expensive ingredient, but also it is a hazardous material to handle because of its explosive tendencies.

Objects and advantages of the invention will be set forth in part hereinafter and in part will be obvious herefrom, or may be learned by practice with the invention, the same being realized and attained by means of the steps, methods, combinations and improvements pointed out in the appended claim.

The invention consists in the novel steps, methods, combinations and improvements herein shown and described.

It is an object of this invention to provide a novel multi-stage process for the production of gamma L-glutamyl hydrazide from L-glutamic acid in a simple and economical manner which avoids the isolation and purification of the intermediate L-pyrrolidone carboxylic acid produced by said process. Another object of this invention is to provide a novel multi-stage process for the manufacture of gamma L-gultamyl hydrazide from L-glutamic acid in a safe manner and which avoids the use of anhydrous hydrazine. A further object of this invention is to provide a novel process for the manufacture of gamma L-glutamyl hydrazide from L-glutamic acid which eliminates the use of expensive organic solvents, except for washing operations.

It has been found that the above objects may be realized by carrying out the following multi-stage process involving a number of reactions all of which are carried out in an aqueous medium. The use of an aqueous system in accordance with this invention eliminates the use of organic solvents except for washing the reaction product. Hence, the instant process not only provides a more inexpensive process than the prior methods using organic solvent systems, but it is also safer.

In the first stage of the instant process, L-glutamic acid in the form of an aqueous solution is heated at a suitable temperature, pressure, time and pH to cause dehydration of L-glutamic acid. This dehydration step is well known and is discussed in detail in an article by Wilson et al., J. Biol. Chem. 119, 308–331 (1937). The resulting solution is then evaporated to form a syrupy material which may be designated crude L-pyrrolidone carboxylic acid. The crude L-pyrrolidone carboxylic acid formed in the aforedescribed first stage reaction contains the desired intermediate L-pyrrolidone carboxylic acid and small amounts of unreacted L-glutamic acid (e.g., 9%) as an impurity and water (e.g., 2%). On standing, the aforedescribed product solidifies in the form of a solid cake.

In the second stage of the instant process, the crude L-pyrrolidone carboxylic acid is broken up into a form suitable for solution such, for example, as a coarse powder. The crude L-pyrrolidone carboxylic acid in such form is mixed with aqueous hydrazine such, for example, as commercial 85% hydrazine hydrate (a solution of about 55% hydrazine in water).

Preferably, the reaction is carried out at room temperature. The reaction time at this temperature is about 5 days. If so desired, a reaction temperature above or below room temperature may be employed, the reaction time varying inversely with the temperature employed. It has been found that lower yields are obtained when the reaction temperature is above about 60° C. The reaction time at 60° C. is about 2 days. Good results are obtained when the reaction is carried out at a temperature in the range from about room temperature to 60° C. for about 2 to 7 days, the time varying inversely with the temperature as indicated above.

In general, the hydrazine, based on a dry weight basis, is in an amount of at least one mole, and preferably about 1.25 to about 1.5 moles, per mole of L-glutamic acid employed in the first stage reaction. Of course, higher amounts of hydrazine can be used than those indicated above, but for economical reasons hydrazine is usually within the above indicated range.

It has been found that the highest yields of gamma L-glutamyl hydrazide are obtained when the total water content in the second stage reaction medium does not exceed about 60% by weight of the amount of L-glutamic acid employed in the first stage reaction. The term "total water content" means the water present in the second stage reaction regardless of its source. Accordingly, it includes the water remaining from the first stage reaction, the water from the aqueous hydrazine and any additional water that might be added to the second stage medium.

The crude gamma L-glutamyl hydrazide formed in the aforedescribed manner crystallizes on standing to form a solid cake. This solid cake of gamma L-glutamyl hydrazide is then purified in a suitable manner. For example, the crude gamma L-glutamyl hydrazide may be slurried with a 90% methanol-10% water mixture. Gamma L-glutamyl hydrazide is insoluble in the 90% methanol-10% water mixture while L-glutamic acid or the hydrazine salt thereof is soluble in such a mixture. Accordingly, a purified gamma L-glutamyl hydrazine is obtained when the slurry is filtered. The gamma L-glutamyl hydrazide may then be further washed with a 90% methanol-10% water mixture for further removal of impurities, and the hydrazide is finally washed with a solvent such, for example, as 100% methanol to remove water and any trace of impurities left from the 90% methanol-10% water wash.

In order to describe the invention even further, the following working example is given for the manufacture of gamma L-glutamyl hydrazide from glutamic acid employing an aqueous system except for washing operations.

EXAMPLE I

L-glutamic acid (454 g.) is dissolved in one liter of water and heated to 122° C. under pressure for 8 hours.

The resultant solution is evaporated under atmospheric pressure until the temperature of the residue reaches 125° C. The syrup (about 440 g.) predominantly of L-pyrrolidone carboxylic acid is allowed to solidify in pans. The crude L-pyrrolidone carboxylic acid in the form of a coarse powder is then added to 240 ml. of commercial 85% hydrazine hydrate with stirring and cooling to maintain a temperature of 30–40° C. After stirring for 3 to 4 hours at about 30° C. crystallization starts. The mixture is poured into pans and allowed to stand at room temperature for 4 days. The solid cake of gamma L-glutamyl hydrozide is slurried in 1000 ml. of 90% methanol-10% water mixture, filtered and washed with 200 ml of 90% methanol-10% water mixture, followed by further washing with 200 ml of anhydrous methanol. About 400 g. of gamma L-glutamyl hydrazide is recovered.

The instant invention provides a safe, economical method for the manufacture of gamma L-glutamyl hydrazide from L-glutamic acid, in good yields and purities. This method avoids the isolation and purification of pyrrolidone carboxylic acid. It further avoids the necessity of using anhydrous hydrazine, an expensive and difficult material to handle. By employing an aqueous system except for washing operations, this process provides a most inexpensive and safe process. In short, the instant method provides a simple procedure for manufacturing gamma L-glutamyl hydrazide using the most economical of available raw materials.

The invention in its broader aspects is not limited to the specific steps, methods, combinations and improvements described but departures may be made therefrom within the scope of the accompanying claim without departing from the principles of the invention and without sacrificing its chief advantages.

What is claimed is:

A multi-stage process for the manufacture of gamma L-glutamyl hydrazide from L-glutamic acid, comprising dehydrating, in a first stage, L-glutamic acid to form, as a first stage reaction product, crude L-pyrrolidone carboxylic acid, comprising mainly L-pyrrolidone carboxylic acid and small amounts of unreacted L-glutamic acid, as an impurity, and water, combining in a second stage, said first stage reaction product and aqueous hydrazine to form an aqueous reaction medium, and permitting them to react in said second stage in said aqueous reaction medium to form, as a second stage reaction product, crude gamma L-glutamyl hydrazide comprising mainly gamma L-glutamyl hydrazide and a minor amount of the hydrazine salt of L-glutamic acid, the hydrazine in said aqueous reaction medium being in an amount of at least one mole per mole of L-glutamic acid employed in the first stage reaction, and the total water content of the aqueous reaction medium not exceeding 60% by weight of the L-glutamic acid employed in the first stage reaction, purifying said crude L-glutamyl hydrazide, by treatment thereof with a solvent mixture of about 90% methanol and about 10% water in which said L-glutamyl hydrazide is insoluble but in which the hydrazine salt of L-glutamic acid is soluble.

References Cited in the file of this patent

UNITED STATES PATENTS

| | | |
|---|---|---|
| 2,524,422 | Booth et al. | Oct. 3, 1950 |
| 2,788,370 | Rath | Apr. 9, 1957 |
| 2,806,855 | Hoglan | Sept. 17, 1957 |

OTHER REFERENCES

Takayama: Bull. Chem. Soc., Japan, Vol. 8, 260–534, pages 137–43 (1933).

Foreman: Biochem. Journal, vol. 8, pages 481–93, 260–534 (1914). (Copies in Sci. Library.)